United States Patent
Fujimori et al.

(10) Patent No.: US 9,377,299 B2
(45) Date of Patent: Jun. 28, 2016

(54) SENSOR DEVICE, RECORDING APPARATUS, AND POSITION ADJUSTMENT METHOD OF OPTICAL AXIS

(71) Applicant: SEIKO EPSON CORPORATION, Tokyo (JP)

(72) Inventors: Naoyuki Fujimori, Shimosuwa-machi (JP); Kenji Yanagishita, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 455 days.

(21) Appl. No.: 13/774,780

(22) Filed: Feb. 22, 2013

(65) Prior Publication Data
US 2013/0258338 A1 Oct. 3, 2013

(30) Foreign Application Priority Data
Apr. 2, 2012 (JP) ................................. 2012-083968

(51) Int. Cl.
G01B 11/27 (2006.01)
G02B 7/00 (2006.01)
G01B 5/25 (2006.01)

(52) U.S. Cl.
CPC ............... *G01B 11/272* (2013.01); *G01B 5/25* (2013.01); *G01B 11/27* (2013.01); *G02B 7/003* (2013.01)

(58) Field of Classification Search
None
See application file for complete search history.

(56) References Cited

U.S. PATENT DOCUMENTS

| 2,040,265 | A | * | 5/1936 | McNeill et al. | 250/576 |
| 3,906,240 | A | * | 9/1975 | Jeffree | 250/223 R |
| 3,956,632 | A | * | 5/1976 | Hall et al. | 250/223 R |
| 4,450,391 | A | * | 5/1984 | Hara | 388/820 |
| 6,345,763 | B1 | * | 2/2002 | Matsuda | H04N 1/00708 235/459 |
| 6,827,414 | B2 | | 12/2004 | Iwatsuki et al. | |
| 2003/0197750 | A1 | | 10/2003 | Iwatsuki et al. | |
| 2009/0322823 | A1 | | 12/2009 | Ito et al. | |
| 2010/0302556 | A1 | * | 12/2010 | Bishop et al. | 356/621 |

FOREIGN PATENT DOCUMENTS

| JP | 11-271466 | 10/1999 |
| JP | 2003-311938 | 11/2003 |
| JP | 2006-168040 | 6/2006 |
| JP | 2009-052203 | 3/2009 |
| JP | 2010-005917 | 1/2010 |
| JP | 2012-056144 | 3/2012 |

* cited by examiner

Primary Examiner — Gordon J Stock, Jr.
(74) Attorney, Agent, or Firm — Workman Nydegger

(57) ABSTRACT

A sensor device according to the invention includes a transmission type sensor pair that includes a light emitting unit and a light receiving unit, an optical axis alignment mechanism that aligns optical axes of the light emitting unit and the light receiving unit, and a fixing frame that is adjusted by the optical axis alignment mechanism, and in which the sensor pairs are fixed in a state in which the optical axes of the light emitting unit and the light receiving unit are aligned.

7 Claims, 9 Drawing Sheets

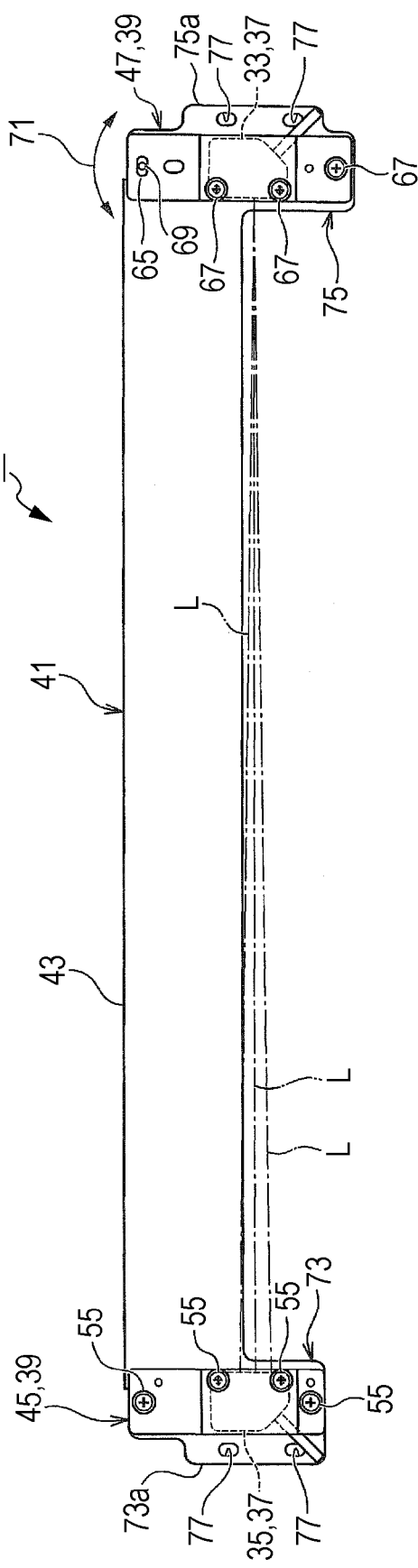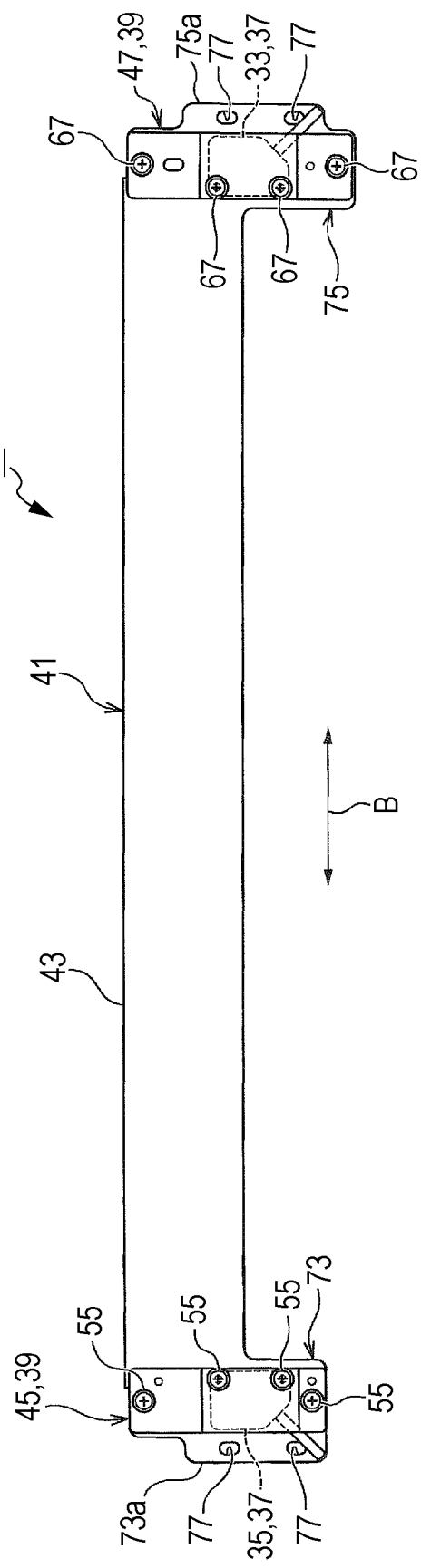

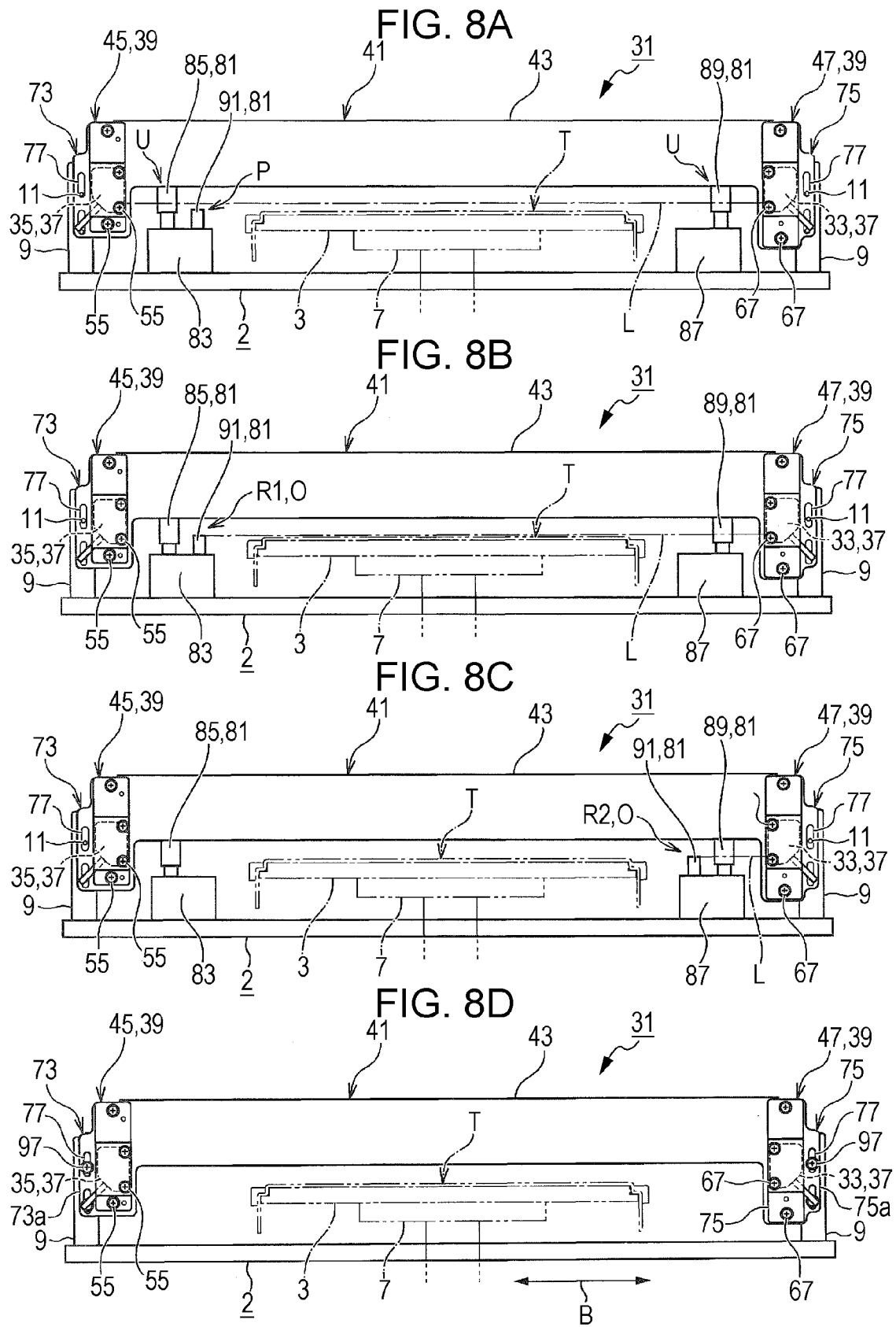

SENSOR DEVICE, RECORDING APPARATUS, AND POSITION ADJUSTMENT METHOD OF OPTICAL AXIS

BACKGROUND

1. Technical Field

The present invention relates to a sensor device including transmission type sensor pairs having a light emitting unit and a light receiving unit, a recording apparatus including the sensor device, and a position adjustment method of an optical axis using the sensor device.

2. Related Art

In the related art, a sensor device including a transmission type sensor pairs having a light emitting unit and a light receiving unit has been used in order to detect lifting, bending, or wrinkle of a recorded material such as the fabric that is set or the like, as disclosed in JP-A-2003-311938.

When such a sensor device is fixed in a machine frame of the recording apparatus, alignment of optical axes of the light emitting unit and the light receiving unit is performed on a main body frame of the recording apparatus using an adjustment elongated hole that is provided in a fixing bracket of the light emitting unit side and a fixing bracket of the light receiving unit side which are prepared as an option.

However, an adjustment operation of aligning the optical axes of the light emitting unit and the light receiving unit performed using a plurality of adjustment elongated holes in the two fixing brackets of the light emitting unit side and the light receiving unit side is difficult, and there is a problem that the adjustment takes time.

However, when, for example, a position of a height direction of an object to be detected, on which detection is performed by the sensor pairs, is changed, position adjustment of the height direction of the optical axes is required in addition to the adjustment of optical axes alignment of the light emitting unit and the light receiving unit. Performing these two kinds of adjustments on the recording apparatus takes more time.

SUMMARY

An advantage of some aspects of the invention is to readily perform adjustment of optical axes alignment of a light emitting unit and a light receiving unit and position adjustment of the optical axes in a sensor device including transmission type sensor pairs having the light emitting unit and the light receiving unit.

According to an aspect of the invention, there is provided a sensor device including: a transmission type sensor pair that includes a light emitting unit and a light receiving unit; an optical axis alignment mechanism that aligns optical axes of the light emitting unit and the light receiving unit; and a fixing frame that is adjusted by the optical axis alignment mechanism, and in which the sensor pairs are fixed in a state in which the optical axes of the light emitting unit and the light receiving unit are aligned.

According to the aspect, the sensor device includes the fixing frame that is adjusted by the optical axis alignment mechanism, and in which the sensor pairs are fixed in a state in which the optical axes of the light emitting unit and the light receiving unit are aligned. That is, the sensor device includes the fixing frame that can integrally maintain the sensor pairs while maintaining the state in which the optical axes of the light emitting unit and the light receiving unit are aligned.

Accordingly, prior to mounting the sensor pairs to a machine frame of a corresponding mounting portion, optical axis alignment of the sensor pairs may be performed using a corresponding fixing frame in a portion different from the corresponding mounting portion. Thus, it is possible to easily perform optical axis alignment.

In the sensor device according to the aspect of the invention, the optical axis alignment mechanism may include a fixing bracket that supports one side of the light emitting unit and one side of the light receiving unit and is fixedly mounted to the fixing frame and a movable bracket that supports the other sides of the light emitting unit and the light receiving unit and is movably mounted to the fixing frame, and align the optical axes by adjusting a mounting position of the movable bracket.

According to the aspect, the one side of the light emitting unit and one side of the light receiving unit may be fixedly supported by the fixing bracket, and a mounting angle of only the other side of the light emitting unit and the other side of the light receiving unit may be changed by adjusting a mounting position of the movable bracket, thereby performing optical axis alignment.

Accordingly, compared to optical axis alignment of the related art that separately adjusts the mounting angle of the light emitting unit and the light receiving unit, optical axis alignment of the sensor pairs may be readily performed.

In the sensor device according to the aspect of the invention, the movable bracket may include a first reference portion that is an oscillation fulcrum of the movable bracket and a first adjustment portion that allows the movable bracket to be oscillated, and the movable bracket may be oscillated through the first adjustment portion with respect to the first reference portion in a state before being fixed to the fixing frame so that the light emitting unit or the light receiving unit is oscillated at a predetermined angle and in a first direction.

According to the aspect, by a simple configuration such as providing, for example, a first reference hole as the first reference portion and an elongated first adjustment hole as the first adjustment portion in the movable bracket, it is possible to adjust the optical axis in the first direction by adjusting the mounting angle of the light emitting unit and the light receiving unit which are maintained in the corresponding movable bracket.

Accordingly, when the first direction is determined as a vertical direction, it is possible to perform optical axis alignment of the sensor pairs only by oscillating, in the vertical direction, the light emitting unit or the light receiving unit which is maintained in the movable bracket.

In the sensor device according to the aspect of the invention, an intermediate movable bracket may be provided between the light emitting unit or the light receiving unit mounted to the movable bracket and the movable bracket, include an engagement portion that is an oscillation fulcrum with respect to the movable bracket and an oscillation portion that allows oscillation with respect to the movable bracket, and be oscillated through the oscillation portion with respect to the engagement portion in a state before being fixed to the movable bracket so that the light emitting unit or the light receiving unit is oscillated at a predetermined angle and in a second direction crossing the first direction.

According to the aspect, in addition to the optical axis alignment in the first direction by the movable bracket, it is possible to perform optical axis alignment in the second direction crossing the first direction by the intermediate movable bracket.

Accordingly, by providing the intermediate movable bracket, it is possible to perform more accurate optical axis alignment compared to the optical axis alignment by the sensor pairs.

In the sensor device according to the aspect, the fixing frame may include an optical axis position adjustment unit that is used for position adjustment of the optical axes of the sensor pairs.

According to the aspect, it is possible to adjust a position of the fixing frame by the optical axis position adjustment unit. Accordingly, it is possible to adjust the position of the optical axis of the sensor pairs while a state in which the optical axes of the sensor pairs are maintained by the fixing frame.

According to another aspect, there is provided a recording apparatus in which a sensor device including transmission type sensor pairs having a light emitting unit and a light receiving unit is mounted to a machine frame, wherein the sensor device is the sensor device according to any one of first to fifth embodiments.

According to the aspect, the optical axis alignment of the sensor pairs may not be performed when the sensor device is mounted to the machine frame of the recording apparatus, but may be completed before the sensor device is mounted to the machine frame of the recording apparatus.

Accordingly, when the sensor device is mounted to the machine frame of the recording apparatus, it is preferable that only the position adjustment of, for example, a height direction of the optical axes of the sensor pairs, be performed. As a result, it is possible to readily mount the sensor device to the machine frame of the recording apparatus, so that the mounting of the sensor device may be performed in a short period of time.

According to still another aspect of the invention, there is provided a position adjustment method of an optical axis that performs position adjustment of optical axes of the sensor pairs using the sensor device according to any one of the first to fifth embodiments, wherein, using an optical axis position adjustment jig including a first movable position adjustment member provided in a first frame reference member of the light receiving unit side, a second movable position adjustment member provided in a second frame reference member of the light emitting unit side, and a position setting reference member of a predetermined position capable of obtaining a first position that blocks an optical axis path of the sensor pairs and a second position that does not block the optical axis path, the first position and the second position being sequentially provided in the first frame reference member and the second frame reference member, the position of the optical axes of the sensor pairs is adjusted by sequentially adjusting positions of the light receiving unit side and the light emitting unit side of the fixing frame with respect to the fixing frame in a state in which the optical axes of the light emitting unit and the light receiving unit are aligned by the sensor device.

According to the aspect, it is possible to separately adjust a position of the fixing frame, for example, a position of a height direction in the light emitting unit side and the light receiving unit side by the optical axis position adjustment jig with respect to the fixing frame in a state in which the optical axes of the sensor pairs are aligned. Accordingly, the position (for example, position of the height direction) of the optical axes of the sensor pairs may be readily adjusted while maintaining the state in which the optical axes of the sensor pairs are aligned.

In the position adjustment method of the optical axis according to the aspect, a position installation reference member is provided in the first frame reference member or the second frame reference member of a side of adjusting a position of the fixing frame, and is relatively moved towards the second position from the first position or towards the first position from the second position by moving the first position adjustment member or the second position adjustment member of the side of adjusting the position of the fixing frame so that the position of the optical axis is adjusted to have a predetermined height set by the position installation reference member.

According to the aspect, it is possible to adjust the position (for example, height) of the fixing frame as a position (for example, height) set by the installation reference member in each of the light emitting unit side and the light receiving unit side, using the straight-traveling property of light emitted from the light emitting unit.

When position adjustment of the optical axes of the sensor pairs is performed, by lifting the first position adjustment member and the second position adjustment member from a lower limit position towards an upper limit position, a light receiving start point where light reaches the light receiving unit beyond a height of the position installation reference member may be obtained, whereby potion (height) adjustment of the optical axes of the sensor pairs may be performed.

In addition, by lowering the first position adjustment member and the second position adjustment member from, for example, the upper limit position towards the lower limit position, a light receiving end point where light does not reach the light receiving unit due to the lower position than the height of the position installation reference member may be obtained, whereby position adjustment of the optical axes of the sensor pairs may be performed.

BRIEF DESCRIPTION OF THE DRAWINGS

The invention will be described with reference to the accompanying drawings, wherein like numbers reference like elements.

FIGS. 6A and 6B are front views showing a process of aligning an optical axis in a position adjustment method of an optical axis according to an embodiment of the invention.

FIGS. 8A to 8D are front views showing another example of a process of adjusting an optical axis position in a position adjustment method of an optical axis according to an embodiment of the invention.

DESCRIPTION OF EXEMPLARY EMBODIMENTS

Figure 1:
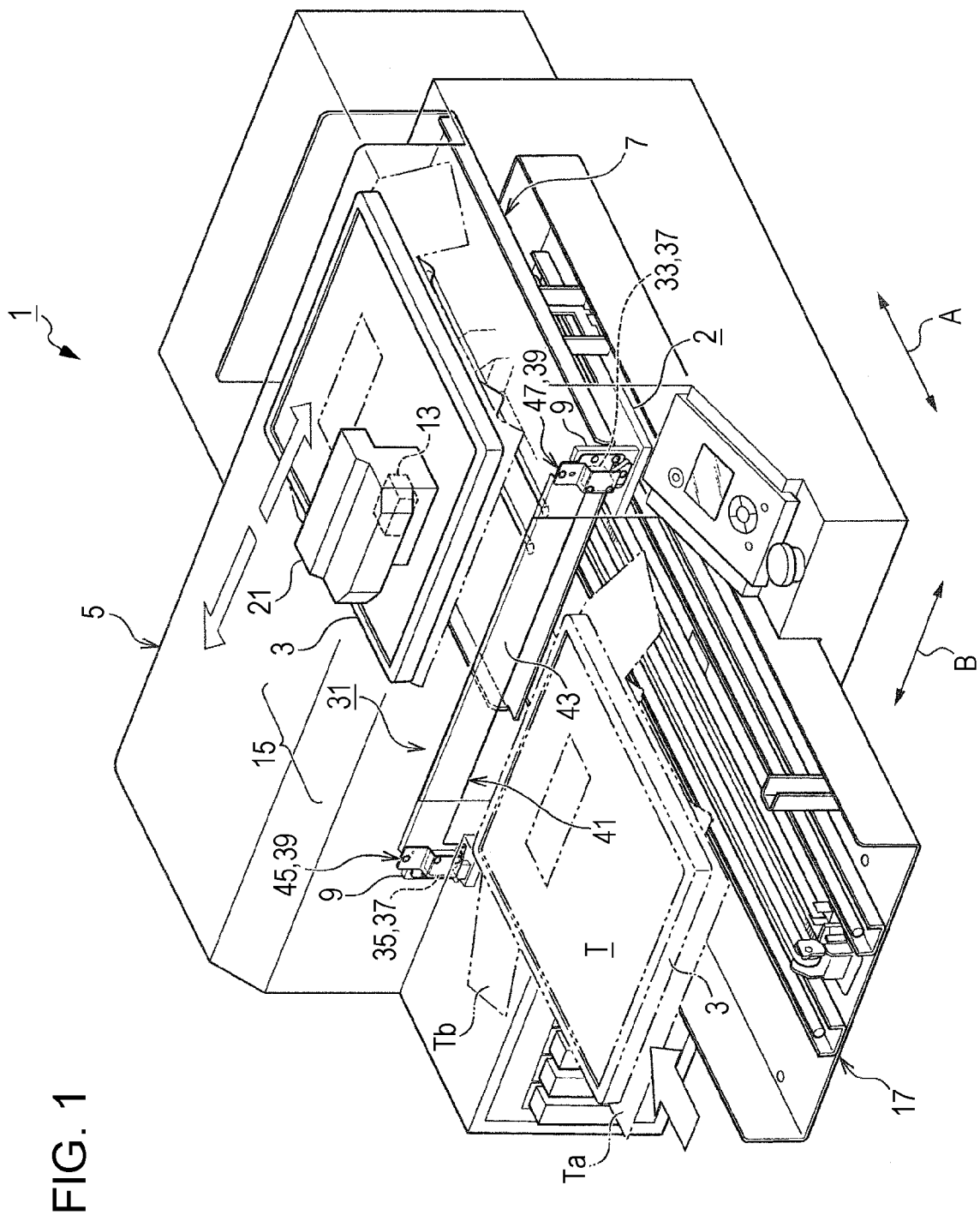
FIG. 1 is a perspective view showing a schematic configuration of an ink jet printing device in which a sensor device according to an embodiment of the invention is mounted.
Figure 2:
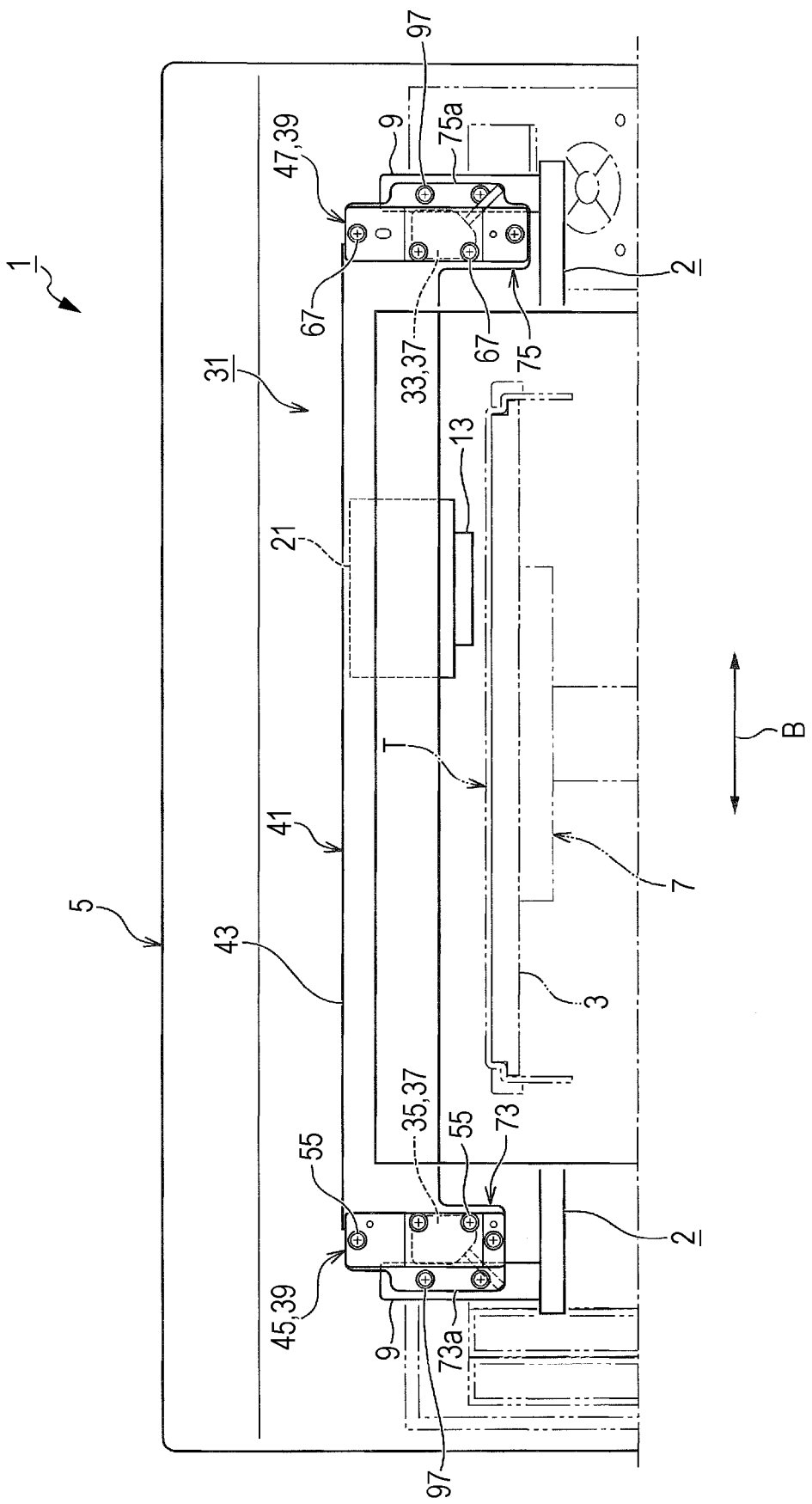
FIG. 2 is a front view showing a schematic configuration of an ink jet printing device in which a sensor device according to an embodiment of the invention is mounted.

First, a schematic overall configuration of a recording apparatus of the invention will be described with reference to FIGS. 1 and 2. Subsequently, a sensor device according to an embodiment of the invention and a position adjustment method of an optical axis according to the invention that is performed using the sensor device will be described with reference to FIGS. 3 to 8D.

However, in the following descriptions, as an example of a material to be recorded, a material T to be printed (hereinafter, referred to as "cloth") may be given. In FIG. 1, a T-shirt in which a trunk portion Ta and a sleeve portion Tb are sewed in a tubular shape is illustrated. In addition, in the following descriptions, as the recording apparatus, an ink jet printing device 1 will be described.

In addition, the illustrated ink jet printing device 1 includes a carriage 21 in which an ink ejection head 13 is mounted, an elevatable support frame 5 that has a gate shape as an example in which a drive mechanism of the carriage 21, which is not shown, is stored, a traveling frame 7 that transports, towards a lower printing execution region 15 of the support frame 5, the material T to be printed that has been set in a set tray 3, and a transport device 17 that drives the traveling frame 7.

In addition, a machine main frame 9 that supports the sensor device 31 according to the invention, which will be described later, is provided above a main body frame 2 for supporting the traveling frame 7 and the transport device 17 as an example.

Embodiments (See FIGS. 3 to 8D)

The sensor device 31 according to an embodiment of the invention includes a transmission type sensor pair 37 that includes a light emitting unit 33 and a light receiving unit 35, an optical axis alignment mechanism 39 that aligns optical axes L of the light emitting unit 33 and the light receiving unit 35, and a fixing frame 43 that is adjusted by the optical axis alignment mechanism 39, and in which the sensor pair 37 is fixed in a state in which the optical axes L of the light emitting unit 33 and the light receiving unit 35 are aligned.

Specifically, the sensor device 31 includes the transmission type sensor pair 37 having the light emitting unit 33 and the light receiving unit 35 and a support member 41 including the optical axis alignment mechanism 39 of the light emitting unit 33 and the light receiving unit 35. The sensor device 31 includes a fixing frame 43 that integrally holds the sensor pair 37 while the support member 41 maintains a state in which optical axes L of the light emitting unit 33 and the light receiving unit 35 which are set by the optical axis alignment mechanism 39 are aligned.

The sensor pair 37 is a sensor that is used to detect an object to be detected that is an obstacle passing over a path of the optical axes L having a straight advance property formed between the light emitting unit 33 and the light receiving unit 35, and a photoelectric sensor is used as the sensor pair 37.

In addition, when using such a transmission type sensor, it is necessary to perform optical axis alignment of the optical axes L of the sensor pair 37, and the optical axis alignment mechanism 39 is used for the optical axis alignment.

In the present embodiment, the optical axis alignment mechanism 39 includes a fixing bracket 45 that supports one side of the light emitting unit 33 and one side of the light receiving unit 35 and is fixedly mounted to the fixing frame 43 and a movable bracket 47 that supports the other sides of the light emitting unit 33 and the light receiving unit 35 and is movably mounted to the fixing frame 43.

In the illustrated embodiments, the fixing bracket 45 is used as a bracket for holding the light receiving unit 35, and the movable bracket 47 is used as a bracket for holding the light emitting unit 33.

The fixing bracket 45 is a bracket that is molded by bending, for example, a metal plate material in which a concave space 49 for storing and holding the light receiving unit 35 is formed at a center thereof. Two mounting holes 51 and 51 for holding the light receiving unit 35 are formed at a center of the fixing bracket 45, and two positioning holes 53 and 53 for mounting the fixing bracket 45 to the fixing frame 43 in a positioned state are formed in upper and lower blade portions of the fixing bracket 45.

In addition, four fixing screws 55 are individually inserted into the two mounting holes 51 and 51 and the two positioning holes 53 and 53 from the outside, and screwed into a screw hole 57 formed in the fixing frame 43 and a screw hole, which is not shown, formed in the light receiving unit 35.

The movable bracket 47 is a bracket that is molded by bending a plate in which a concave space 59 for storing and holding the light emitting unit 33 is formed at a center thereof. Two mounting holes 61 and 61 for holding the light emitting unit 33 are formed at a center of the movable bracket 47. A first reference hole 63 that is a first reference unit for mounting the movable bracket 47 in a state in which a position where the movable bracket 47 is mounted to the fixing frame 43 is adjustable, and a first adjustment hole 65 that is a first adjustment unit formed in an elongated hole shape are formed in upper and lower blade portions.

Figure 3:
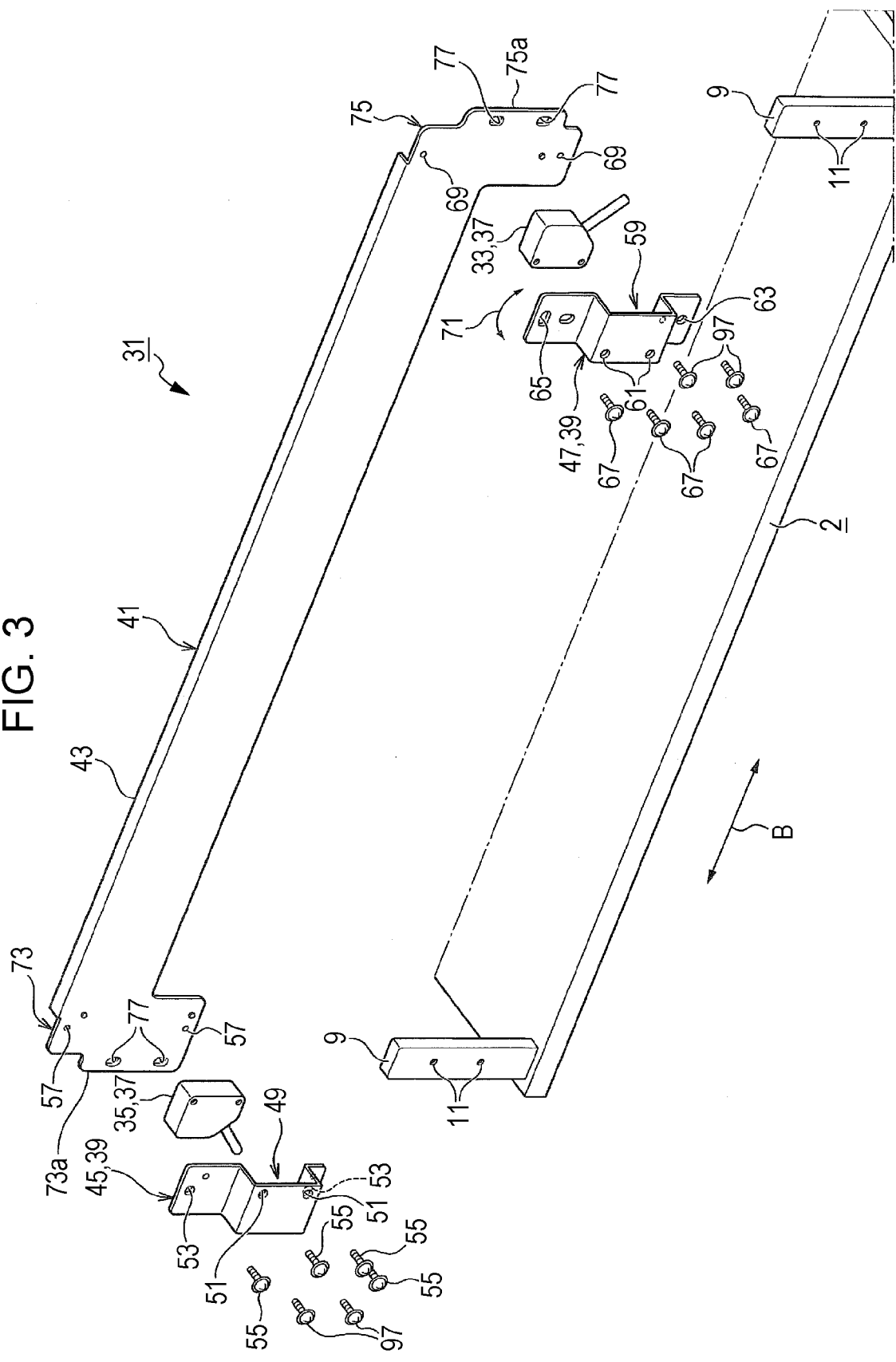
FIG. 3 is an exploded perspective view showing an overall configuration of a sensor device according to an embodiment of the invention.
Figure 4:
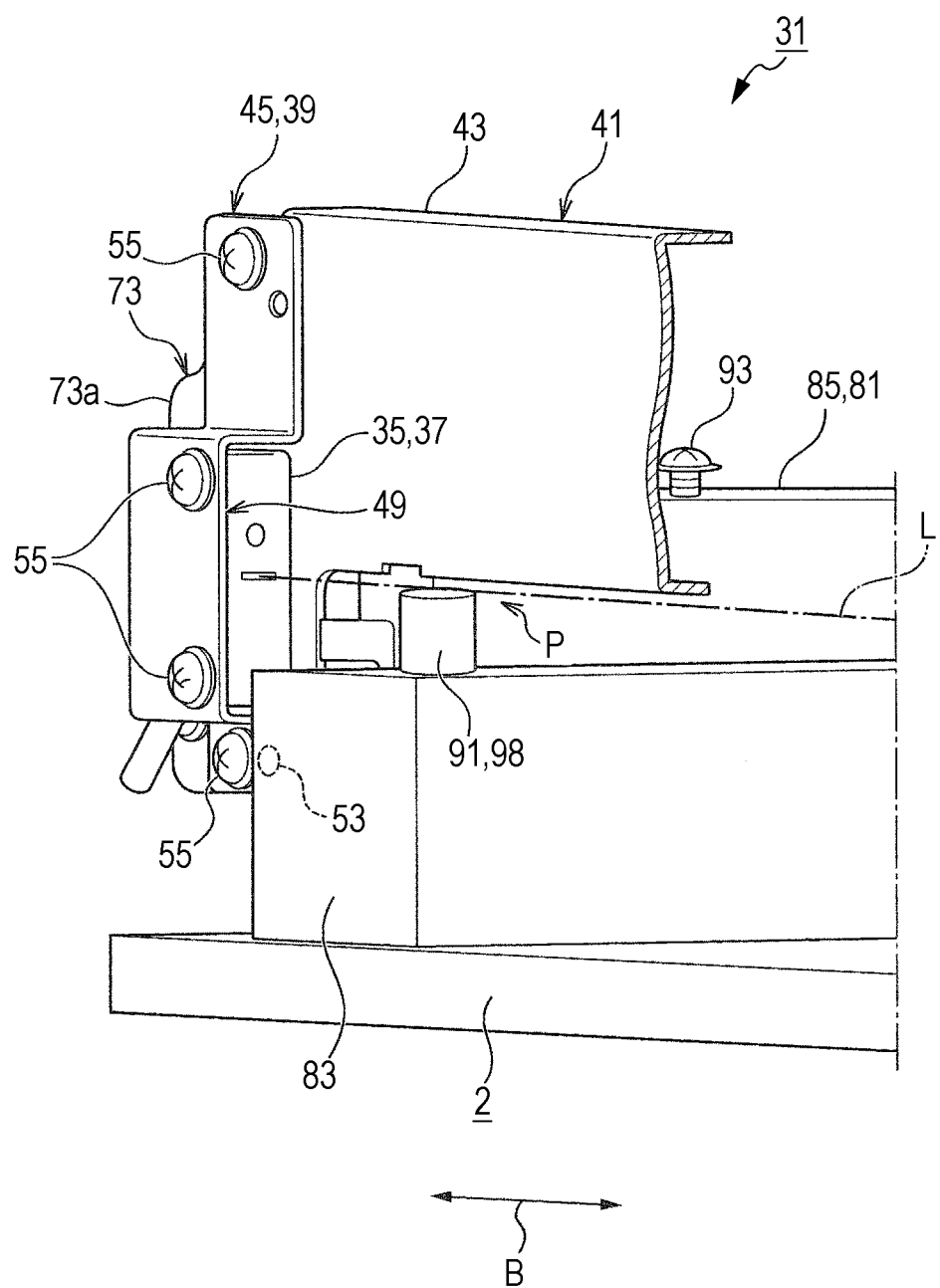
FIG. 4 is an enlarged perspective view showing a periphery of a fixing bracket of a sensor device according to an embodiment of the invention.
Figure 5:
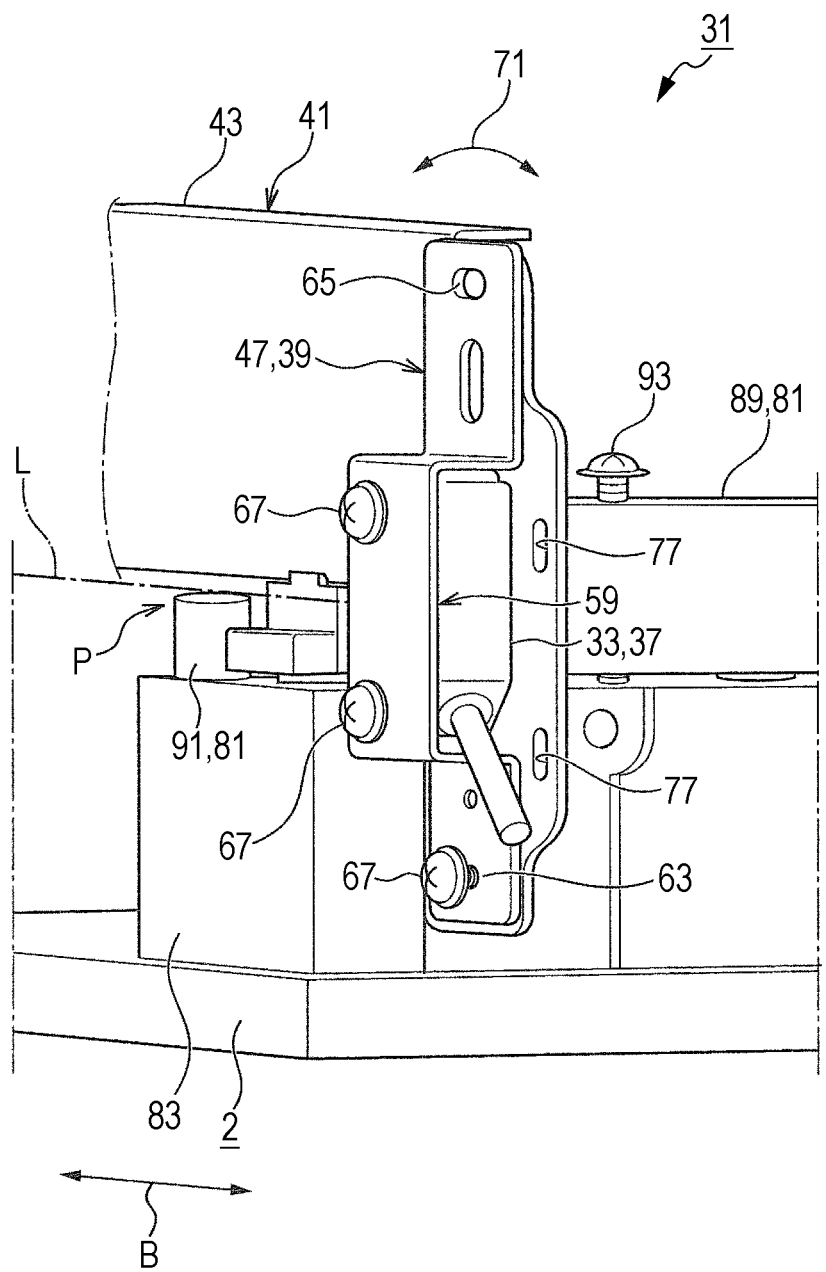
FIG. 5 is an enlarged perspective view showing a periphery of a movable bracket of a sensor device according to an embodiment of the invention.

The movable bracket 47 oscillates the light emitting unit 33 that is stored in the concave space 59 in a range of a length of the first adjustment hole 65 and held by the fixing screw 67, at a predetermined angle in a vertical direction shown by an arrow of FIG. 3, which is parallel to a vertical plane that is a first direction 71, using a fixing screw 67 that is inserted into the first reference hole 63 and mounted in a half-fixed state as an oscillation fulcrum.

In addition, optical axis alignment of the optical axes L of the sensor pair 37 in which light emitted from the light emitting unit 33 reaches the light receiving unit 35 is completed by oscillating the movable bracket 47, and then the fixing screw 67 that is mounted to the first reference hole 63 in a half-fixed state is firmly tightened. Moreover, the fixing screw 69 is inserted into the first adjustment hole 65 from the outside, and screwed into the screw hole 67 formed in the fixing frame 43. Therefore, the sensor pair 37 is mounted to the fixing frame 43 in a fixed state while maintaining the optical axis alignment state of the optical axes L of the sensor pair 37.

The fixing frame 43 is a metal plate member having a long gate shape in a width direction B, and a first attachment plate 73 in which the screw hole 57 for mounting the fixing bracket 45 is formed is provided in a left end side of the fixing frame 43.

In addition, a second attachment plate 75 in which the screw hole 69 for mounting the movable bracket 47 is formed is provided in a right end side of the fixing frame 43. In addition, in the first attachment plate 73 and the second attachment plate 75, ear portions 73a and 75a that respectively protrude outward are formed. In the ear portions 73a and 75a, two height adjustment oblong holes 77 that are used for adjusting (will described later) a height of the optical axes L of the sensor pair 37 and are long in a vertical direction are formed on each of the left and right sides, that is, a total of four height adjustment oblong holes 77.

Next, the position adjustment method of the optical axis that is performed using the sensor device 31 of the present embodiment configured as above will be described.

The position adjustment method of the optical axis of according to the invention includes a (1) process of aligning optical axes and a (2) process of adjusting an optical axis position (height).

1. Process of Aligning Optical Axes (See FIGS. 3, 6A and 6B)

The process of aligning the optical axes is a process that performs optical axis alignment of the optical axes L of the sensor pair 37 by adjusting an attachment angle of any one of the light emitting unit 33 and the light receiving unit 35 using the optical axis alignment mechanism 39.

First, the light receiving unit 35 is stored in the concave space 49 of the fixing bracket 45, and is mounted to the fixing bracket 45 using the fixing screw 55. Next, as shown in FIG. 6A, the fixing screws 55 and 55 are inserted into the upper and lower positioning holes 53 and 53 from the outside, and screwed into the screw holes 57 and 57 formed in the first attachment plate 73 of the fixing frame 43, whereby the fixing bracket 45 is mounted to the fixing frame 43 in a fixed state.

In the same manner, the light emitting unit 33 is stored in the concave space 59 of the movable bracket 47, and is mounted to the movable bracket 47 using the fixing screw 67. Next, as shown in FIG. 6A, the fixing screw 67 is inserted into the lower first reference hole 63, and firmly tightened with a tightening force of an extent of preventing the movable bracket 47 from being automatically rotated, whereby the movable bracket 47 is mounted to the fixing frame 43 in a half-fixed state.

When the movable bracket 47 is oscillated in the first direction 71 so that the light receiving unit 35 has a predetermined angle through which corresponding light is detected by causing the light emitting unit 33 to emit light, and the light receiving unit 35 has the predetermined angle through which the corresponding light is detected, the fixing screw 67 is inserted into the first adjustment hole 65 as shown in FIG. 6B, and further screwed into the upper screw hole 69 of the second attachment plate 75 of the fixing frame 43, whereby attachment of the movable bracket 47 to the fixing frame 43 is completed.

However, the sensor pair 37 subjected to the optical axis alignment of the optical axes L in this manner is integrated with the fixing frame 43 while the optical axis alignment state of the optical axes L is maintained, transported to the ink jet printing device 1, and mounted to the machine main frame 9 of the ink jet printing device 1.

2. Process of Adjusting Optical Axis Position (See FIGS. 4, 5, 7A to 7D, and 8A to 8D)

The process of adjusting an optical axis position is a process that performs position adjustment of the optical axes L of the sensor pair 37 subjected to the optical axis alignment of the optical axes L using an optical axis position adjustment jig 81. Here, position adjustment of a height direction will be described.

The optical axis position (height) adjustment jig 81 used in the present process includes a movable bracket that is an elevatable first position (height) adjustment member 85 that is provided on the first frame reference member 83 of the light receiving unit 35 side on an upper surface of the main body frame 2 of the ink jet printing device 1, an elevatable second position (height) adjustment member 89 that is provided on the second frame reference member 87 of the light emitting unit 33 side, and a position (height) installation reference member 91 of a predetermined position (height) capable of taking a first position O for blocking an optical axis path of the sensor pair 37 and a second position P for not blocking the optical axis path of the sensor pair 37 which are sequentially provided above the first frame reference member 83 and the second frame reference member 87.

In addition, in the present process, by sequentially adjusting a height of the fixing frame 43 of the light receiving unit 35 and the light emitting unit 33, a height position of the optical axes L of the sensor pair 37 is adjusted.

In addition, when adjusting the actual height adjustment of the optical axes L, the position installation reference member 91 is installed on the first frame reference member 83 or the second frame reference member 87 of a side of adjusting the height of the fixing frame 43, and the first position adjustment member 85 or the second position adjustment member 89 of a side of adjusting the height of the fixing frame 43 is elevated, whereby the height of the optical axes L is adjusted to have a predetermined height set by the position installation reference member 91 by relatively moving the position installation reference member 91 from the first position O to the second position P or from the second position P to the first position O.

Hereinafter, with reference to FIGS. 7A to 7D, (A) a procedure of adjusting the optical axes L of a case of moving the position installation reference member 91 from the first position to the second position will be described in detail. Subsequently, with reference to FIGS. 8A to 8D, (B) a procedure of adjusting the optical axes L of a case of moving the position installation reference member 91 from the second position to the first position will be described in detail.

A. Case of Moving Position Installation Reference Member from First Position to Second Position (See FIGS. 7A to 7D)

Figure 7A:
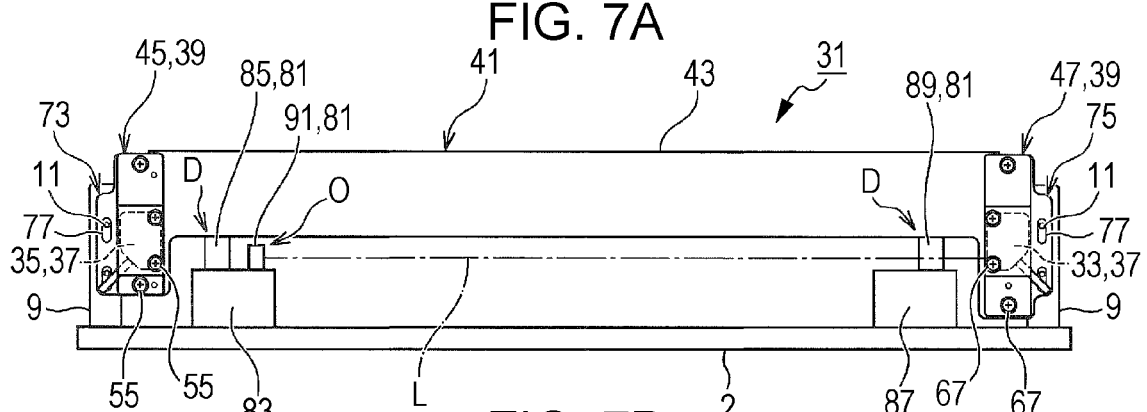
FIGS. 7A to 7D are front views showing an example of a process of adjusting an optical axis position in a position adjustment method of an optical axis according to an embodiment of the invention.

In this case, by turning each of the position adjustment screws 93 (see FIGS. 4 and 5) provided in the first position adjustment member 85 and the second position adjustment member 89 in a predetermined direction, the first position adjustment member 85 and the second position adjustment member 89 are moved to a lower limit position D shown in FIG. 7A.

In addition, as shown in FIG. 7A, the position installation reference member 91 is installed on the first frame reference member 83 of the light receiving unit 35 side, and the fixing frame 43 of the sensor device 31 subjected to the optical axis alignment of the optical axes L in the previous process is set so as to be spanned over the first position adjustment member 85 and the second position adjustment member 89.

However, in this state, the optical axes L is blocked by the position installation reference member 91 and the position installation reference member 91 is relatively positioned in the first position O where light does not reach the light receiving unit 35, as shown in FIG. 7A.

Next, by turning the position adjustment screw 93 of the first position adjustment member 85 side in a direction opposite to the above-described direction, the first position adjustment member 85 is moved towards an upper limit position U. However, in this instance, the fixing frame 43 is guided by a guide or the like which is not shown, and moved upward while maintaining a substantially horizontal posture.

Figure 7B:
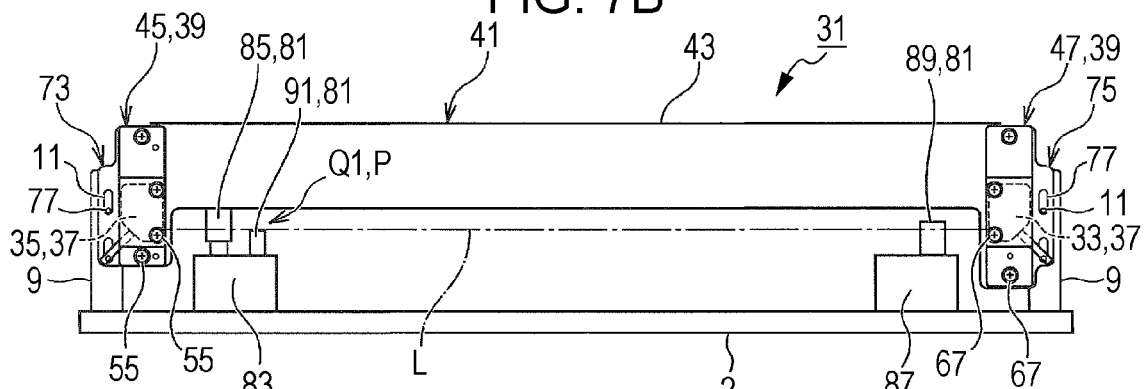

When further turning the position adjustment screw 93, the position installation reference member 91 is moved to the second position P where light emitted from the light emitting unit 33 reaches the light receiving unit 35 beyond a height of the position installation reference member 91 as shown in FIG. 7B. However, a relative position of the position installation reference member 91 is referred to as a light receiving start point Q1.

Figure 7C:
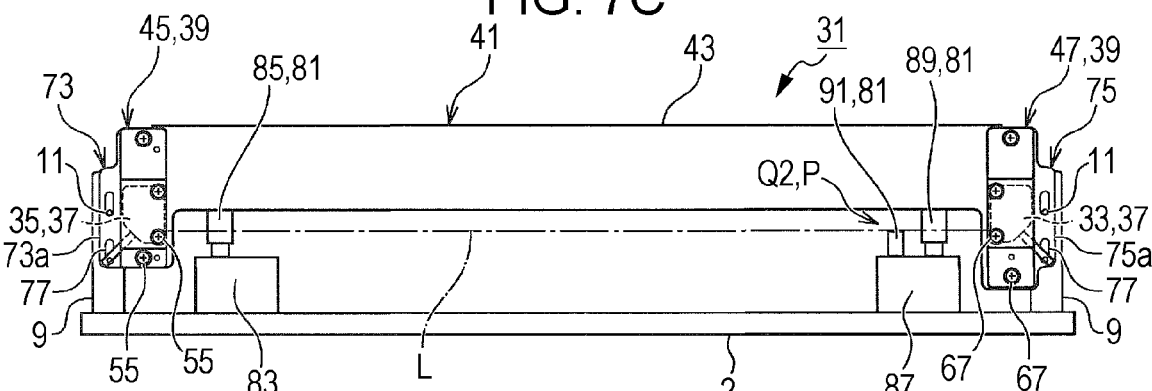

Next, as shown in FIG. 7C, the position installation reference member 91 is moved over the second frame reference member 87 of the light emitting unit 33 side, and the position adjustment screw 93 (see FIGS. 4 and 5) of the second position adjustment member 89 side is turned in a predetermined direction so that the second position adjustment member 89 is moved toward an upper limit position U.

When further turning the position adjustment screw 93, as shown in FIG. 7C, the position installation reference member 91 is moved to the second position P where light emitted from the light emitting unit 33 reaches the light receiving unit 35 above a height of the position installation reference member 91. However, in this instance, a relative position of the position installation reference member 91 is referred to as a light receiving start point Q2.

When a height of the fixing frame 43 satisfying the two light receiving start points Q1 and Q2 becomes an intended attachment height, position (height) adjustment of the optical axes L of the sensor pair 37 is completed.

Figure 7D:
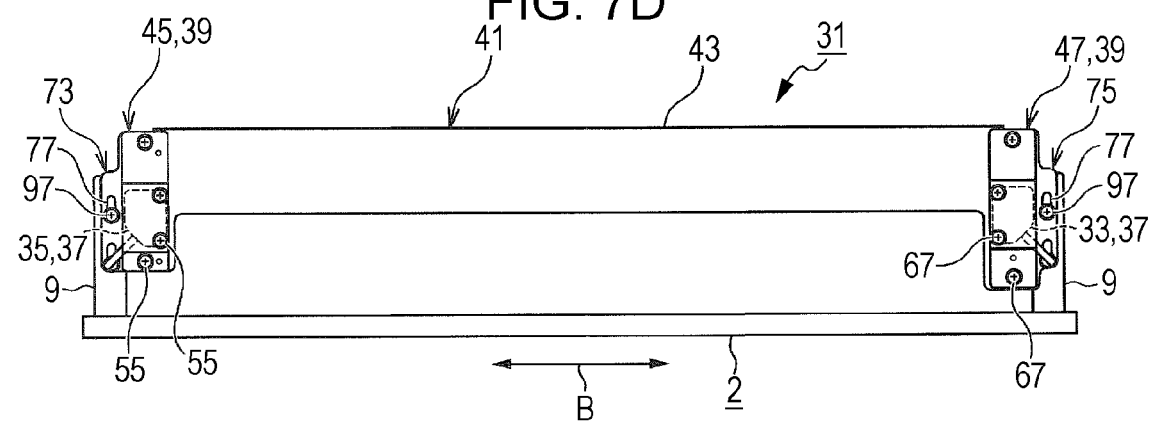

Next, the fixing screw 97 is inserted into the height adjustment oblong hole 77 formed in the ear portion 73a of the first attachment plate 73 and the ear portion 75a of the second attachment plate 75 from the outside of the fixing frame 43, and is screwed into the screw hole 11 formed in the machine main frame 9. Therefore, as shown in FIG. 7D, the sensor device 31 in which the optical axis alignment of the optical axes L and the position (height) adjustment of the optical axes 1 have been completed is mounted to the ink jet printing device 1.

B. Case of Moving Position Installation Reference Member from Second Position to First Position (See FIGS. 8A to 8D)

In this case, by turning each of the position adjustment screws 93 provided in the first position adjustment member 85 and the second position adjustment member 89 in a predetermined direction, the first position adjustment member 85 and the second position adjustment member 89 are first moved to the upper limit position U shown in FIG. 8A.

In addition, as shown in FIG. 8A, the position installation reference member 91 is installed on the first frame reference member 83 of the light receiving unit 35 side, and the fixing frame 43 of the sensor device 31 subjected to the optical axis alignment of the optical axes L in the previous process is set so as to spanned over the first position adjustment member 85 and the second position adjustment member 89.

However, in this state, as shown in FIG. 8A, the optical axes L are positioned above the position installation reference member 91 beyond the height of the position installation reference member 91, and therefore the position installation reference member 91 is relatively positioned in the second position P where light emitted from the light emitting unit 33 reaches the light receiving unit 35.

Next, by turning the position adjustment screw 93 of the first position adjustment member 85 side and the position adjustment screw 93 of the second position adjustment member 89 side in a direction opposite to the above-described direction, the first position adjustment member 85 and the second position adjustment member 89 are moved towards the lower limit position D. However, in this instance, the fixing frame 43 is guided by a guide or the like which is not shown, and moved downward while maintaining a substantially horizontal posture.

When further turning the two position adjustment screws 93, as shown in FIG. 8B, the light emitted from the light emitting unit 33 is blocked by the position installation reference member 91, and therefore the position installation reference member 91 is moved to the first position O where the light does not reach the light receiving unit 35. However, in this instance, a relative position of the position installation reference member 91 is referred to as a light receiving end point R1.

Next, as shown in FIG. 8C, the position installation reference member 91 is moved over the second frame reference member 87 of the light emitting unit 33 side, and the position adjustment screws 93 of each of the first position adjustment member 85 side and the second position adjustment member 89 side are fine adjusted and turned in a predetermined direction. Therefore, as shown in FIG. 8C, the position installation reference member is moved to the first position O where the light emitted from the light emitting unit 33 is blocked by the position installation reference member 91 and does not reach the light receiving unit 35. However, in this instance, a relative position of the position installation reference member 91 is referred to as a light receiving end point R2.

When a height of the fixing frame 43 that satisfies the two light receiving end points R1 and R2 becomes an intended attachment height, the position (height) adjustment of the optical axes L of the sensor pair 37 is completed.

Next, the fixing screw 97 is inserted into the height adjustment oblong hole 77 formed in the ear portion 73a of the first attachment plate 73 and the ear portion 75a of the second attachment plate 75 of the left and right sides of the fixing frame 43 from the outside, and screwed into the screw hole 11 formed in the machine main frame 9. Therefore, as shown in FIG. 8D, the sensor device 31 in which the optical axis alignment of the optical axes L and the position (height) adjustment of the optical axes L have been completed is mounted to the ink jet printing device 1.

According to the sensor device 31 and the recording apparatus 1 according to the present embodiment configured as above, the optical axis alignment of the optical axes L which is separately performed in the light emitting unit 33 side and the light receiving unit 35 side in the related art may be simply and accurately performed only on one side of the light emitting unit 33 side and the light receiving unit 35 side in a short period of time. In addition, the optical axis alignment of the optical axes L may be performed prior to a step before the sensor device 31 is mounted to the recording apparatus 1, whereby it is possible to achieve efficiency of the installation of the sensor device 31.

In addition, according to the position adjustment method of the optical axis using the optical axis position adjustment jig 81, position (height) adjustment of the optical axes L that is significantly suitable for the sensor device 31 that is integrated by the fixing frame 43 may be performed, whereby it is possible to accurately and simply perform the position (height) adjustment of the optical axes L in a short period of time.

Another Embodiment

The sensor device 31, the recording apparatus 1, and the position adjustment method of the optical axis according to the invention may have basically the above-described configuration, but changes or omissions of a partial configuration may be performed without departing from the gist of the invention.

Figure 9:
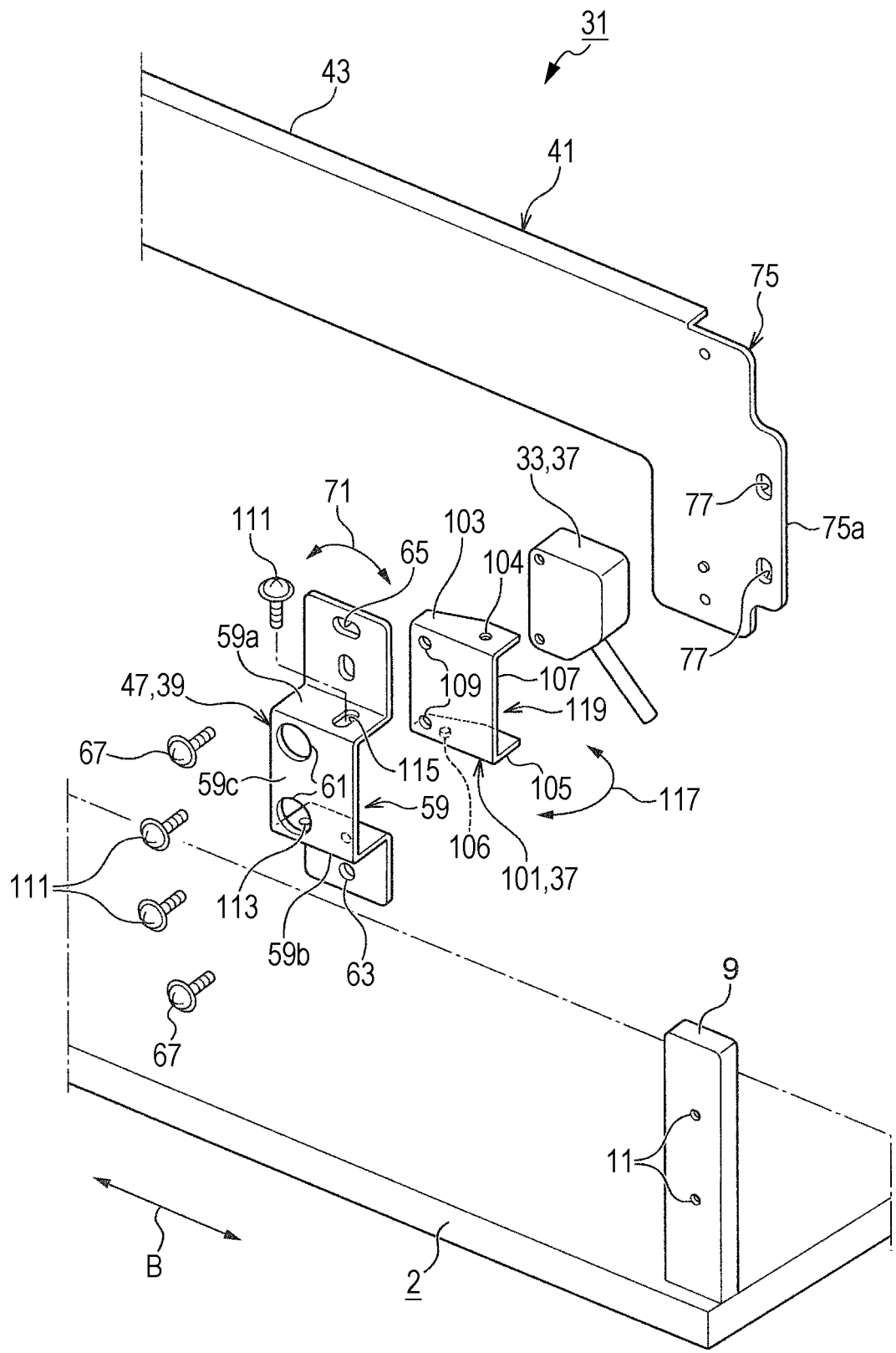
FIG. 9 is an enlarged perspective view showing a periphery of a movable bracket of a sensor device according to another embodiment of the invention.

For example, as shown in FIG. 9, an intermediate movable bracket 101 is provided between the movable bracket 47 and the light emitting unit 33, an optical axis alignment direction of the optical axes L may be increased to two directions, thereby improving accuracy of the optical axis alignment of the optical axes L.

That is, in FIG. 9, an intermediate movable bracket 101 that is fitted in the concave space 59 of the movable bracket 47, and includes a top plate portion 103, a bottom plate portion 105, and a side plate portion 107 which is molded by bending a metal plate material as an example may be provided. In the top plate portion 103 of the intermediate movable bracket 101, a screw hole 104 that is screwed into a fixing screw 111 inserted from the outside of an oblong second adjustment hole 115 that is provided in a top plate portion 59a forming the concave space 59 of the movable bracket 47 may be formed.

In the present embodiment, the screw hole 104 is an oscillation portion that allows oscillation with respect to the movable bracket 47 of the intermediate movable bracket 101.

In addition, in the bottom plate portion 105 of the intermediate movable bracket 101, an engagement convex portion 106 that protrudes downward is formed. In the present embodiment, the engagement convex portion 106 is the engagement portion that is an oscillation fulcrum with respect to the movable bracket of the intermediate movable bracket 101.

The engagement convex portion 106 is fitted in a second reference hole 113 formed in a bottom plate portion 59b in the concave space 59 of the movable bracket 47, whereby the engagement convex portion 106 is used as the oscillation fulcrum. Therefore, the light emitting unit 33 is oscillated in a range of a length of the second adjustment hole 115 at a predetermined angle and in a lateral direction indicated by an arrow of FIG. 9 which is parallel to a horizontal plane that is a second direction 117 crossing the first direction 71.

In addition, in the side plate portion 107 of the intermediate movable bracket 101, an attachment hole 109 for inserting a shaft portion of a fixing screw 111 for storing and fixing the light emitting unit 33 in the concave space 119 of the intermediate movable bracket 101 is formed. Therefore, between an outer surface of the side plate portion 107 of the intermediate movable bracket 101 and an inner surface of a side plate portion 59c in the concave space 59 of the movable bracket 47, a gap for allowing oscillation of the intermediate movable bracket 101 in a predetermined angle range is formed.

In addition, in the embodiment shown in FIG. 9, a diameter of an attachment hole 61 provided in the movable bracket 47 is increased so as to penetrate a head portion of the fixing screw 111. Therefore, a shaft portion of a tightening tool is inserted into the attachment hole 61 from the outside of the movable bracket 47, and therefore a tightening operation for mounting the light emitting unit 33 to the intermediate movable bracket 101 may be performed.

Still Another Embodiment

Aside from what is described above, the optical axis alignment mechanism 39 of the sensor device 31 may respectively mount both the light emitting unit 33 and the light receiving unit 35 by the movable bracket 47. In this case, the optical axis alignment of the optical axes L becomes slightly difficult, but more delicate optical axis alignment of the optical axes L become possible. The optical axis alignment state of the optical axes L is maintained as is by the fixing frame 43 as described in the above embodiment.

In addition, the position installation reference member 91 used in the position adjustment method of the optical axes according to the invention may be configured by the material T to be printed itself in which printing is performed. In this case, the highest point of a surface to be printed in the material T to be printed that performs printing while transporting the material T to be printed in a transport direction A by the transport device 17 may be detected, and a height of the optical axes L of the sensor pair 31 in accordance with the highest is adopted.

In addition, the sensor device 31 of the invention may be applicable to a variety of recording apparatus 1 without being limited to the ink jet printing device 1 described above, and may be used for various purposes other than the recording apparatus 1. For example, the sensor device 31 may be used as a sensor for detecting presence or absence of an object to be transported, which is moved on a conveyer line or a height (size).

The entire disclosure of Japanese Patent Application No. 2012-083968, filed Apr. 2, 2012 is expressly incorporated by reference herein.

What is claimed is:

1. A sensor device comprising:
 a light emitting unit that emits light;
 a light receiving unit that is configured to detect the light emitted by the light emitting unit;
 a fixing frame;
 a fixing bracket that supports one of the light emitting unit and the light receiving unit, and is fixedly mounted to the fixing frame; and
 a movable bracket that supports the other of the light emitting unit and the light receiving unit, and is movably mounted to the fixing frame; wherein
 the movable bracket is configured to oscillate so that the light receiving unit receives the light emitted by the light emitting unit wherein the movable bracket includes a first reference portion that is an oscillation fulcrum of the movable bracket and a first adjustment portion that allows the movable bracket to be oscillated, and the movable bracket is configured to oscillate by using the first reference portion as the oscillation fulcrum at a predetermined angle in a first direction,
 further comprising:
 an intermediate movable that is provided between the other of the light emitting unit and the light receiving unit mounted to the movable bracket and the movable bracket;
 wherein
 the intermediate movable bracket includes an engagement portion that is an oscillation fulcrum of the intermediate movable bracket, and
 the intermediate movable bracket is configured to oscillate by using the engagement portion as the oscillation fulcrum in a second direction crossing the first direction.

2. A recording apparatus comprising the sensor device according to claim 1.

3. A position adjustment method of the sensor device according to claim 1, comprising:
 adjusting a position of one of the light emitting unit and the light receiving unit; and
 adjusting a position of the other of the light emitting unit and the light receiving unit.

4. The sensor device according to claim 1, wherein the fixing frame includes an adjustment unit that adjusts a height of the fixing frame.

5. The position adjustment method according to claim 3, wherein a height of the fixing frame is adjusted by adjusting the position of the light emitting unit and the position of the light receiving unit.

6. A recording apparatus comprising the sensor device according to claim 4.

7. A position adjustment method of the sensor device according to claim 4, comprising:
 adjusting a position of one of the light emitting unit and the light receiving unit; and
 adjusting a position of the other of the light emitting unit and the light receiving unit.

* * * * *